United States Patent
Davies

(10) Patent No.: US 8,087,577 B2
(45) Date of Patent: Jan. 3, 2012

(54) RADIO FREQUENCY IDENTIFICATION TAG READER AND METHOD

(75) Inventor: Samuel Richard Davies, Christchurch (NZ)

(73) Assignee: Data Acquisitions Limited (NZ)

( * ) Notice: Subject to any disclaimer, the term of this patent is extended or adjusted under 35 U.S.C. 154(b) by 541 days.

(21) Appl. No.: 12/298,136

(22) PCT Filed: May 21, 2007

(86) PCT No.: PCT/NZ2007/000120
§ 371 (c)(1), (2), (4) Date: Oct. 23, 2008

(87) PCT Pub. No.: WO2007/136279
PCT Pub. Date: Nov. 29, 2007

(65) Prior Publication Data
US 2009/0065580 A1  Mar. 12, 2009

(30) Foreign Application Priority Data
May 24, 2006  (NZ) ........................................ 547488

(51) Int. Cl.
G06F 17/00 (2006.01)
G06F 19/00 (2011.01)
G06Q 30/00 (2012.01)
G06Q 90/00 (2006.01)
H04Q 5/22 (2006.01)

(52) U.S. Cl. ....... 235/375; 235/385; 340/10.3; 340/10.4

(58) Field of Classification Search .................. 235/375, 235/385, 439, 451; 340/10.1–10.6, 572.1, 340/539.13, 8.1; 705/28
See application file for complete search history.

(56) References Cited

U.S. PATENT DOCUMENTS

| | | | |
|---|---|---|---|
| 4,691,202 A | 9/1987 | Denne | |
| 6,486,780 B1 | 11/2002 | Garber | |
| 6,554,188 B1 | 4/2003 | Johnson | |
| 6,988,079 B1 * | 1/2006 | Or-Bach et al. | 705/28 |
| 7,040,532 B1 * | 5/2006 | Taylor et al. | 235/375 |
| 7,075,412 B1 * | 7/2006 | Reynolds et al. | 340/10.2 |
| 7,570,164 B2 * | 8/2009 | Chakraborty et al. | 340/572.1 |
| 2005/0258955 A1 * | 11/2005 | Gloekler et al. | 340/539.13 |
| 2006/0097873 A1 * | 5/2006 | Vrba et al. | 340/572.1 |
| 2006/0108411 A1 * | 5/2006 | Macurek et al. | 235/375 |
| 2007/0035396 A1 * | 2/2007 | Chand et al. | 340/572.1 |

* cited by examiner

Primary Examiner — Michael G Lee
Assistant Examiner — Suezu Ellis
(74) Attorney, Agent, or Firm — Galbreath Law Offices, P.C.; John A. Galbreath

(57) ABSTRACT

A system that includes a Radio Frequency Identification (RFID) tag reader, said reader includes a reading section, a processing section, memory and a transmitting section; wherein the reading section is configured to read tag data stored on one or more RFID tags, the processing section is configured to process this data and the transmitting section is configured to transmit the result as transmitted data; such that the transmitting section is also configured to transmit updated tag data to the or each of the RFID tags, said updated tag data replacing some or all of the tag data stored on the RFID tag to be updated. The system further includes one or more RFID tags, an intermediate database and a customer database such that the intermediate database is configured to receive the transmitted data, convert it into intermediate data, which is in a format accepted by the customer database, then transmit this to the customer database.

15 Claims, 2 Drawing Sheets

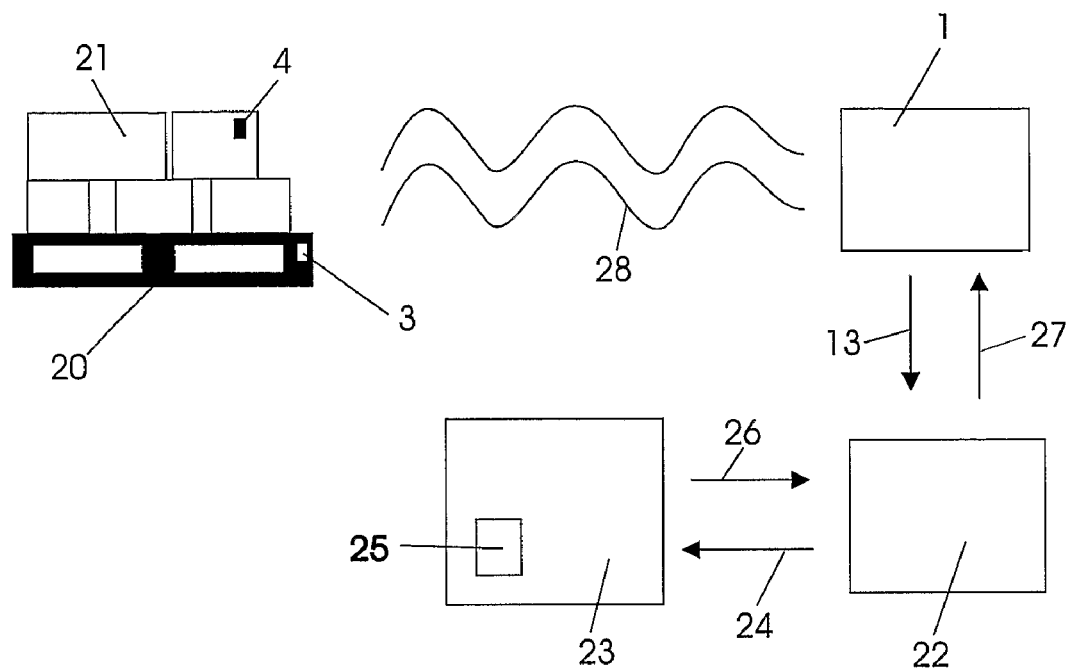
Figure (2)
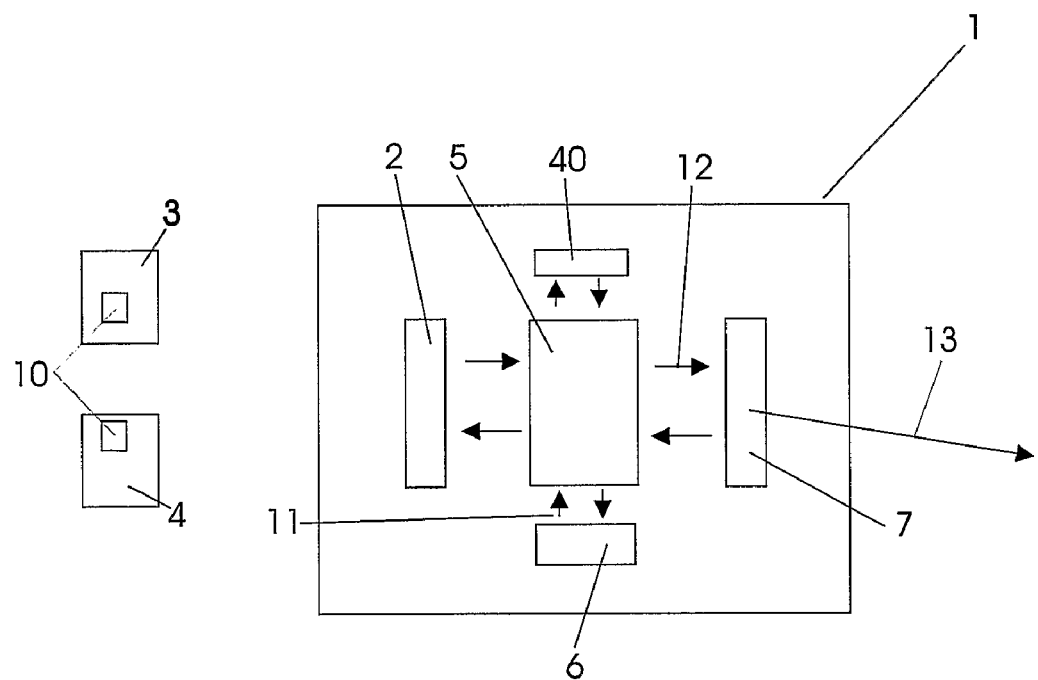
Figure (1)

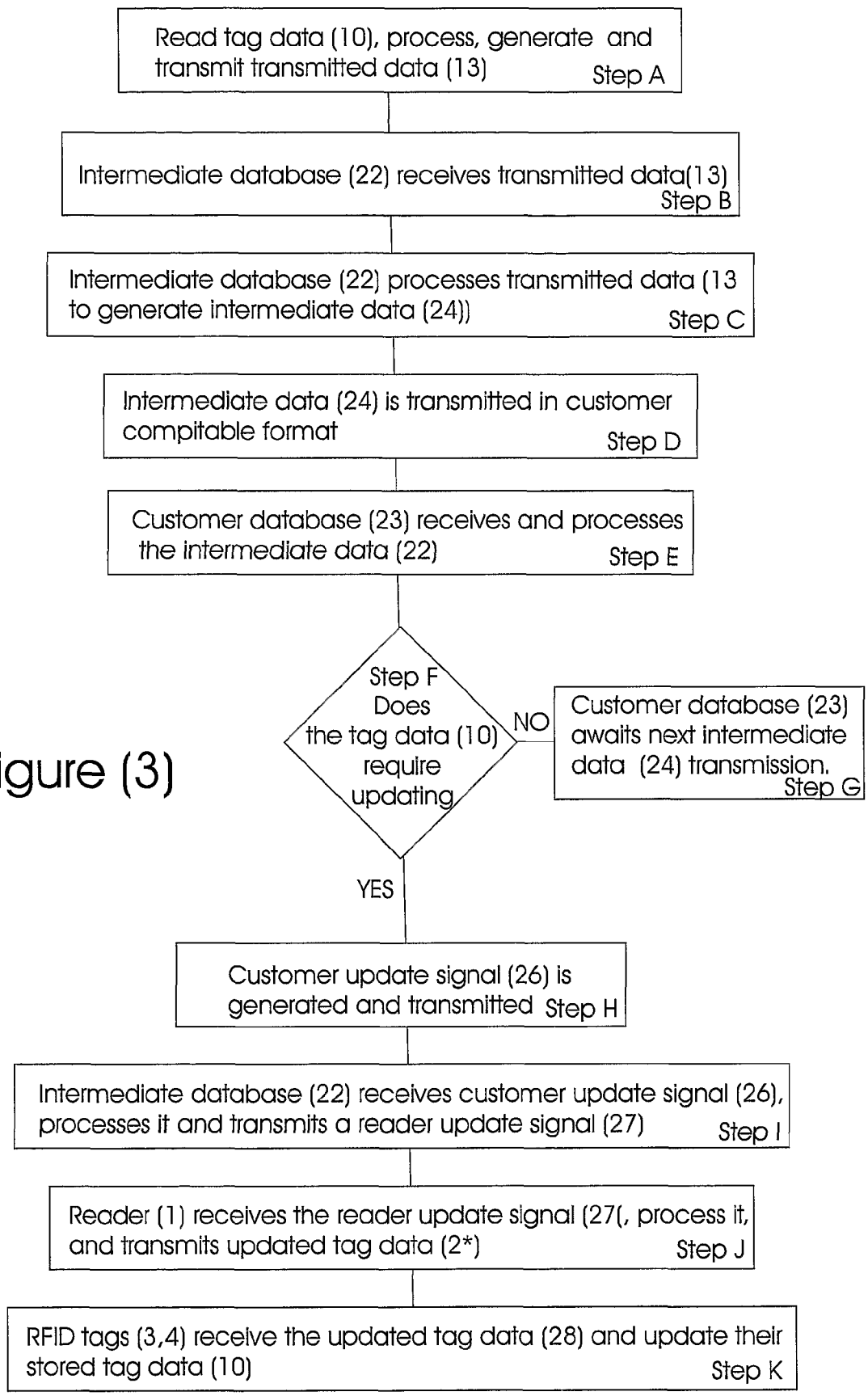

RADIO FREQUENCY IDENTIFICATION TAG READER AND METHOD

FIELD OF THE INVENTION

The present invention relates to a device and method useful for goods tracking, monitoring and reporting. More specifically a device for reading data from, and/or writing data to, a radio frequency identification tag (RFID tag) and interfacing with a database and a method for using this device.

BACKGROUND

It is becoming increasingly important to companies and individuals that they can track items stored in warehouses or in transit, and preferably this is carried out electronically. Thus many goods and/or the pallets or packaging containing the goods, include a Radio Frequency Identification (RFID) tag which can be a passive or active device. The active RFID tag includes an energy source, usually a long life battery, generally to augment the range of the tag, whereas the passive RFID tag depends entirely upon the reader for energy. The passive RFID requires a higher powered reader and has a shorter range, but is cheaper and does not require a battery. In general passive RFID tags are read only i.e. the RFID tag is encoded at the time of manufacture or application to an item and cannot be updated, whereas active RFID tags are often rewriteable. There is nothing that prevents a passive RFID tag from being rewriteable other than cost.

When the RFID tag is read by a reader the information is often transferred to a database which provides further information on the item tagged. These databases can be proprietary and therefore potentially do not accept, store or provide information in a generally accessible format. This can prevent the data from being used/accessed by other databases for legitimate purposes. In addition many proprietary databases were written before RFID tags were in common usage, and therefore they require modification before they allow RFID data to be automatically captured and processed.

One way of avoiding the cost to modify the database is to access the data on the RFID tag using a reader; this data is then manually entered onto the database. This can be time consuming and additionally increases the chance of data entry errors.

RFID tags and readers from one manufacturer may not be usable with another manufacturer's products, or worse still they may be partially compatible. This is in part due to the lack of the industry using a published standard for RFID tags. This can result in sites having to use more than one type of reader.

Once a shipment is in transit there is no way to read the RFID tag until it arrives at its destination; this can lead to shipments being lost or tampered with during transit. This tampering or loss can result in a financial cost to the shipper, manufacturer and/or customer; this cost is often not recoverable.

OBJECT OF THE INVENTION

It is therefore an object of the present invention to provide a device that is capable of reading and writing RFID tag data from most if not all RFID tags and transmitting this to a database in a usable form. It is preferable that the device can accompany an item whilst in transit, and when warehoused, to report on the item status to minimise loss or damage. A further object is to provide a method of tracking an item using an RFID tag that provides information about the item whilst in transit and provides this information in a form that is accessible by a customer's database without incurring the cost of modifying the customer's database. A further object of both the device and method is to provide a useful choice to potential customers.

DISCLOSURE OF THE INVENTION

The present invention provides a RFID (Radio Frequency Identification) tag reader that includes a reading section, a processing section, memory and a transmitting section; wherein the reading section is configured to read tag data stored on one or more RFID tags, the processing section is configured to process this data and the transmitting section is configured to transmit the result as transmitted data; such that the transmitting section is also configured to transmit updated tag data to the or each of the RFID tags, said updated tag data replacing some or all of the tag data stored on the RFID tag to be updated.

Preferably the reader is able to scan one or more frequency bands to read the or each RFID tag within range. It is further preferred that the reading section is configured to accept tag data in more than one format. In a highly preferred form the tag data is stored in memory before it is sent to the transmitting section. In a preferred form the processing includes converting the data to a standard format.

In a highly preferred form, the reader includes an instruction list such that the reading, processing, storage and transmission of the tag data is determined by the instruction list. In a highly preferred form this instruction list can be updated.

The reader is part of a system that includes one or more RFID tags, an intermediate database and a customer database such that the intermediate database is configured to receive the transmitted data, convert it into intermediate data, which is in a format accepted by the customer database, then transmit this to the customer database.

Preferably the customer database is configured to process the customer data and create a customer update signal which is transmitted to the intermediate database. Preferably the intermediate database is configured to process the customer update signal and generate a reader update signal which is transmitted to the reader. Preferably the reader is configured to receive the reader update signal, process it, and generate updated tag data which is transmitted to one or more RFID tag. Preferably the or each RFID tag is configured to check the updated tag data for authenticity then accepting and storing it if authentic.

Preferably the reader update signal also updates the instruction list.

It is preferred that the customer update signal also updates one or more of the following list: the reader instruction list, the reader processing steps, the intermediate database, the processing undertaken by the intermediate database and specific tag data, whether directly or indirectly.

Preferably the customer database is configured to further process the transmitted signal generating customer data which is stored and/or further processed. Preferably the intermediate database processes the transmitted data before converting it into customer data. In a further preferred form the intermediate database stores the transmitted data and customer data.

Preferably the method by which the system operates includes the following steps:
A. Tag data is read, processed and transmitted as transmitted data by a Reader;
B. the transmitted data is received by an intermediate database;

C. the transmitted data is processed by the intermediate database generating intermediate data;
D. the intermediate data is transmitted in customer compatible format to a customer database;
E. the customer database receives and processes the intermediate data.

In a highly preferred form the customer database or intermediate database as part of the processing determines if the tag data presently stored on the or each RFID tag needs updating. Preferably if the customer database determines the tag data needs updating then the following steps are undertaken:
H. the customer database generates a customer update signal and transmits it;
I. the intermediate database receives the customer update signal and processes it to generate a reader update signal which it transmits;
J. the reader receives the reader update signal, and processes it to generate updated tag data which it transmits;
K. the or each RFID tag receives the updated tag data and updates the tag data.

Preferably the customer database generates customer data in step E. Preferably the customer data is stored by the customer database.

In a highly preferred form the updated tag data generated in step H is independently generated for the or each RFID tag.

In a further preferred form the customer data is transmitted to external locations.

In a further preferred form, when the customer database determines the tag data does not need updating then it awaits the next transmission of intermediate data.

In a highly preferred form the update signals or updated tag data is authenticated before processing or storage occurs.

DESCRIPTION OF THE DRAWINGS

By way of example only a specific embodiment of the present invention will now be described in detail with reference to the accompanying drawings in which:—
FIG. 1 is a block diagram of the reader;
FIG. 2 is a diagrammatic view of the RFID tag, reader and databases;
FIG. 3 is a flowchart of the method of the invention.

Referring to the FIG. 1, a reader (1) is shown, said reader (1) includes a reading section (2) configured to read data from one or more RFID (Radio Frequency Identification) tags (3, 4), a processing section (5), a memory (6) and a transmitting section (7). The RFID tags (3, 4) store tag data (10) unique to that RFID tag (3,4) which they are configured to transmit in a predetermined format and at a predetermined frequency.

The reading section (2) is configured to receive the transmitted tag data (10) by scanning predetermined frequency ranges. The received tag data (10) is forwarded to the processing section (5) where it is processed. The processing section is configured to process the tag data (10) in one or more of the following ways:
a. translate the tag data (10) into a different format;
b. store the tag data (10), as received or translated, as stored data (11) in memory (6);
c. forward the tag data (10), as received or translated, as processed data (12) to the transmitting section (7);
d. retrieve the stored data (11), as received or translated, from memory (6) and forward it to the transmitting section (7) as processed data (12);
e. accept the tag data (10) as received and determine if RFID tag (3,4) is to be tracked.

The transmitting section (7) is configured to transmit the processed data (12) as transmitted data (13) by one or more of the following means: analogue or digital radio frequency transmission, electrical or optical cable, infra-red, internet connection or similar. The transmitted data (13) may be encoded, encrypted or otherwise modified by the transmitting section (7) before being transmitted.

The reader (1) forms part of a system as shown in FIG. (2), where the system includes one or more RFID tags (3,4), a pallet (20), goods (21), the reader (1), an intermediate database (22) and a customer database (23). A first RFID tag (3) is associated with the pallet (20), which is used to transport the goods (21). A second RFID tag (4) is attached to the goods (21).

Where the reader (1) is configured to receive and update the tag data (10) using its reading section (2) and transmitting section (7) respectively.

The intermediate database (22) is configured to process the received transmitted data (13). This processing may include one or more of the following operations:
i. read transmitted data (13) and update information stored on intermediate database (22);
ii. read transmitted data (13) and convert it into a customer database (23) compatible format;
iii. further process transmitted data (13) to generate report;
iv. transmit some or all of the data stored on the intermediate database (22) to the customer database (23), as intermediate data (24), in a compatible format;
v. transmit the processed transmitted data (13) in a format compatible to the customer database (23) as intermediate data (24)

The customer database (23) is configured to accept the intermediate data (24) and process and store this as customer data (25). The customer data (25) is used to generate a customer update signal (26) which is transmitted to the intermediate database (22).

The intermediate database (22) is configured to accept the customer update signal (26) and process it to create a reader update signal (27), which it transmits to the reader (1). The reader is configured to accept the reader update signal (27) and process it to create updated tag data (28) which is transmitted to the RFID tags (3,4). The RFID tags (3,4) are configured to receive the updated tag data (28) and, if the updated tag data is correctly identified, update its stored tag data (10).

Both the intermediate database (22) and the customer database (23) can store data relating to the goods (21) and pallet (20) and access this data for further processing. This further processing can include checking for associated tag data (10) from other RFID tags (3,4) to ensure the shipment is still complete or reviewing environmental conditions.

Referring to FIG. (3) the method implemented by the system is shown. The method includes the following steps:
A. tag data (10) is read, processed and transmitted as transmitted data by a Reader (1);
B. the transmitted data (13) is received by a intermediate database (22);
C. the transmitted data (13) is processed by an intermediate database (22) to generate intermediate data (24);
D. the intermediate data (24) is transmitted in customer compatible format;
E. a customer database (23) receives and processes the intermediate data (24);
F. does the tag data (10) need updating, if YES go to H, if NO go to G;
G. await the next intermediate data (24) transmission;
H. generate a customer update signal (26) and transmit;

I. the intermediate database (22) receives the customer update signal (26) processes it and transmits a reader update signal (27);

J. the reader (1) receives the reader update signal (27) processes it and transmits updated tag data (28);

K. RFID tags (3,4) receive the updated tag data (28) and update the tag data (10).

As indicated in the system the data or signal is confirmed as authentic where appropriate to ensure the integrity of the system.

By using an intermediate database (22) the data from the RFID tags can be converted Into a readable format for the customer's database (23) and any instructions or updated information for the RFID tag (3,4) or reader (1) are transmitted back in a compatible format. The data format understood by the reader (1) and/or RFID tags (3,4) need not be made available to the customer, thus security of that and later shipments, which may or may not be destined for the same customer, is maintained.

In a preferred embodiment the method includes only steps A to E, this reads the tag data (10) and updates the customer database (23) but does not update the tag data (10). This may be due to the RFID tag (3,4) being read only, or due to the facility to update the RFID tags (3,4) is not present or implemented. A further embodiment actions steps A to E for the read only RFID tags (3,4), and steps A to K for writeable RFID tags (3,4).

In a further method the customer update signal (26) is received by the intermediate database (22) without intermediate data (24) being sent to the customer database (23). This allows updating of the tag data (10) without reading the tag first.

In a further embodiment (not shown) the reading section (2) and transmitting section (7) are the same physical unit.

In a further embodiment of the system the customer update signal (26) can update the intermediate database (22) and/or the reader (1) as well as the tag data (10) stored by the RFID tags (3,4). These updates can include data and/or processing methods, criteria or even transmission methods and frequencies.

In a further preferred form the reader (1) includes an instruction list (40), this instruction list determines the reading, processing, storage and transmission parameters for the reader (1).

In a further embodiment the reading section (1) transmits a multifrequency radio frequency burst and reads the RFID tag (3,4) responses to obtain the tag data (10).

It should be noted that when tag data (10) is referred to this may be part or all of the data stored by the RFID tag (3,4) in question, and the updated tag data (28) may update part or all of the tag data (10).

Any discussion of the prior art throughout the specification is not an admission that such prior art is widely known or forms part of the common general knowledge in the field.

The invention claimed is:

1. A system that includes a tag reader configured to read an RFID (Radio Frequency Identification Tag), one or more RFID tags, an intermediate database and a customer database; such that the tag reader is configured to read data stored on one or more RFID tags, process this data and transmit the result as transmitted data; and the intermediate database is configured to receive the transmitted data, to convert the transmitted data into intermediate data, which is in a format accepted by the customer database, then to transmit the intermediate data to the customer database characterised in that the customer database is configured to process the intermediate data and create a customer update signal which is transmitted to the intermediate database, and wherein the intermediate database is configured to process the customer update signal and generate a tag reader update signal which is transmitted to the tag reader.

2. The system as claimed in claim 1, characterised in that the intermediate database processes, or stores, or processes and stores, the transmitted data before converting the transmitted data into intermediate data.

3. The system as claimed in claim 1, characterised in that the tag reader is configured to receive the tag reader update signal, process the tag reader update signal, and generate updated tag data which is transmitted to one or more RFID tag.

4. The system as claimed in claim 3, characterised in that the or each RFID tag is configured to check the updated tag data for authenticity.

5. The system as claimed in claim 4, characterised in that the tag reader is configured to receive the tag reader update signal, process the tag reader update signal, and update an instruction list.

6. The system as claimed in claim 1, characterised in that the customer update signal also updates one or more of the following list: tag reader instruction list, the tag reader processing steps, the intermediate database, the processing undertaken by the intermediate database and the specific tag data, whether directly or indirectly.

7. The system as claimed in claim 1, characterised in that the customer database is configured to process the intermediate data and generate customer data, which is stored, or further processed, or stored and further processed, by the customer database.

8. The system as claimed in claim 7, characterised in that the intermediate database stores the transmitted data and the customer data.

9. A method by which the system as claimed in claim 1 operates characterised in that it includes the following steps:

A. tag data is read, processed and transmitted as transmitted data by a tag reader;

B. the transmitted data is received by an intermediate database;

C. the transmitted data is processed by the intermediate database generating intermediate data;

D. the intermediate data is transmitted in customer compatible format to a customer database;

E. the customer database receives and processes the intermediate data;

then the customer database or intermediate database, as part of the processing, determines if the tag data presently stored on the or each RFID tag needs updating, then, if the customer database determines the tag data needs updating then the following steps are undertaken:

F. the customer database generates a customer update signal and transmits the customer update signal;

G. the intermediate database receives the customer update signal and processes the customer update signal to generate a tag reader update signal which the intermediate database transmits;

H. the tag reader receives the tag reader update signal, and processes the tag reader update signal to generate updated tag data which the tag reader transmits;

I. the or each RFID tag receives the updated tag data and updates the tag data.

10. The method as claimed in claim 9, characterised in that the customer database generates customer data in step E.

11. The method as claimed in claim 10, characterised in that some or all of the customer data is stored, or transmitted, or stored and transmitted, to one or more external location.

12. The method as claimed in claim 11, characterised in that the customer database or intermediate database, as part of the processing, determines if the tag data presently stored on the or each RFID tag needs updating.

13. The method as claimed in claim 9, characterised in that the updated tag data generated in step H is independently generated for the or each RFID tag.

14. The method as claimed in claim 9, characterised in that if the customer database determines the tag data does not need updating then the customer database awaits the next transmission of intermediate data.

15. The method as claimed in claim 9, characterised in that the update signals or updated tag data is authenticated before processing or storage occurs.

* * * * *